United States Patent
Zhu et al.

(10) Patent No.: US 12,024,456 B2
(45) Date of Patent: Jul. 2, 2024

(54) DOMESTIC WASTE INCINERATION FLY ASH TREATMENT SYSTEM

(71) Applicant: Nanjing Tech University, Jiangsu (CN)

(72) Inventors: Yuezhao Zhu, Jiangsu (CN); Wenqi Zhang, Jiangsu (CN); Zhenjie Zhang, Jiangsu (CN); Lei Wang, Jiangsu (CN); Yinfeng Wang, Jiangsu (CN)

(73) Assignee: NANJING TECH UNIVERSITY, Jiangsu (CN)

( * ) Notice: Subject to any disclaimer, the term of this patent is extended or adjusted under 35 U.S.C. 154(b) by 0 days.

(21) Appl. No.: 18/261,261

(22) PCT Filed: May 24, 2022

(86) PCT No.: PCT/CN2022/094647
§ 371 (c)(1),
(2) Date: Jul. 12, 2023

(87) PCT Pub. No.: WO2022/247819
PCT Pub. Date: Dec. 1, 2022

(65) Prior Publication Data
US 2024/0067549 A1    Feb. 29, 2024

(30) Foreign Application Priority Data
May 24, 2021    (CN) .......................... 202110564668.9

(51) Int. Cl.
*C02F 9/00*    (2023.01)
*B01J 20/22*    (2006.01)
(Continued)

(52) U.S. Cl.
CPC ............... *C02F 9/00* (2013.01); *B01J 20/226* (2013.01); *B01J 20/3085* (2013.01); *B01J 20/3425* (2013.01); *B01J 20/3475* (2013.01); *B08B 3/102* (2013.01); *B08B 3/14* (2013.01); *B08B 13/00* (2013.01); *B09B 3/80* (2022.01); *B09B 2101/30* (2022.01); *C02F 1/004* (2013.01);
(Continued)

(58) Field of Classification Search
None
See application file for complete search history.

(56) References Cited

U.S. PATENT DOCUMENTS

2005/0137444 A1    6/2005    Chang

FOREIGN PATENT DOCUMENTS

| CN | 101758061 A | 6/2010 |
|---|---|---|
| CN | 103978017 A | 8/2014 |

(Continued)

OTHER PUBLICATIONS

Machine translation of CN-106746124-A, pp. 1-13. (Year: 2017).*
(Continued)

*Primary Examiner* — Clare M Perrin
(74) *Attorney, Agent, or Firm* — Knobbe, Martens, Olson & Bear, LLP (57) ABSTRACT

A domestic waste incineration fly ash treatment system is provided, suitable for clean and efficient treatment of municipal solid waste incineration fly ash, and includes a three-stage water washing subsystem, a filtrate post-treatment subsystem, an MVR evaporation salt production subsystem, a pressure filtration subsystem, and a filter cake post-treatment subsystem.

6 Claims, 6 Drawing Sheets

(51) Int. Cl.
- *B01J 20/30* (2006.01)
- *B01J 20/34* (2006.01)
- *B08B 3/10* (2006.01)
- *B08B 3/14* (2006.01)
- *B08B 13/00* (2006.01)
- *B09B 3/80* (2022.01)
- *B09B 101/30* (2022.01)
- *C02F 1/00* (2023.01)
- *C02F 1/04* (2023.01)
- *C02F 1/28* (2023.01)
- *C02F 1/44* (2023.01)
- *C02F 1/66* (2023.01)
- *C02F 11/122* (2019.01)

(52) U.S. Cl.
CPC ........ *C02F 2001/007* (2013.01); *C02F 1/041* (2013.01); *C02F 1/048* (2013.01); *C02F 1/285* (2013.01); *C02F 1/44* (2013.01); *C02F 1/66* (2013.01); *C02F 11/122* (2013.01)

(56) References Cited

FOREIGN PATENT DOCUMENTS

| | | | |
|---|---|---|---|
| CN | 104843923 A | | 8/2015 |
| CN | 106746124 A | * | 5/2017 |
| CN | 106746124 A | | 5/2017 |
| CN | 206955811 U | | 2/2018 |
| CN | 207081011 U | | 3/2018 |
| CN | 108607870 A | | 10/2018 |
| CN | 109290345 A | | 2/2019 |
| CN | 209139465 U | | 7/2019 |
| CN | 111744495 A | | 10/2020 |
| CN | 212349844 U | | 1/2021 |
| CN | 212370800 U | | 1/2021 |
| CN | 213134439 U | | 5/2021 |
| CN | 113231446 A | | 8/2021 |
| JP | 2005046775 A | | 2/2005 |
| JP | 2005288328 A | | 10/2005 |

OTHER PUBLICATIONS

International Search Report received in International Application No. PCT/CN2022/094647, dated Aug. 10, 2022.
First Office Action in Chinese Application No. 202110564668.9 dated Jan. 19, 2022.
Notification to Grant Patent Right for Invention in Chinese Application No. 202110564668.9 dated Jun. 28, 2022.
Office Action received in Chinese Application No. 202110564668.9, dated Jan. 19, 2022.
Meng, et al. "Research Progress on Adsorption and Removal of Heavy Metal Ions by Covalent Organic Frameworks (COFs)", China Academic Journal Electronic Publishing House, Oct. 2022. Adsorption Separation Technology for Removing Heavy Metals from Water, pp. 12-13.

* cited by examiner

DOMESTIC WASTE INCINERATION FLY ASH TREATMENT SYSTEM

CROSS-REFERENCE TO RELATED APPLICATIONS

This application is a U.S. national stage application of International Patent Application No. PCT/CN2022/094647, filed on May 24, 2022, which claims the benefit and priority of Chinese Patent Application No. 202110564668.9 filed with the China National Intellectual Property Administration on May 24, 2021 and entitled "DOMESTIC WASTE INCINERATION FLY ASH TREATMENT SYSTEM", both of which are incorporated by reference herein in their entities.

TECHNICAL FIELD

The present disclosure relates to the technical field of municipal solid waste incineration fly ash treatment and disposal, in particular to a domestic waste incineration fly ash treatment system.

BACKGROUND

Domestic waste incineration has the advantages of obvious reduction, less occupation of land resources, and energy utilization, and has gradually become a mainstream way of domestic waste treatment and disposal. However, a large amount of fly ash produced by municipal solid waste incineration contains toxic and harmful substances such as heavy metals and dioxin, which has become hazardous wastes which need to be controlled in all countries of the world. In the Standard for Pollution Control of Domestic Waste Incineration (GB 18485-2014 with amendments), fly ash is classified as hazardous waste, and it is stipulated that fly ash must be stabilized and treated harmlessly.

At present, the treatment and disposal technologies of waste incineration fly ash mainly include solidification/stabilization, high-temperature sintering, high-temperature melting, and cement kiln co-disposal. However, no matter what kind of technology, high-content chlorides, dioxin and heavy metals in fly ash have a great negative impact on the environmental protection characteristics, product characteristics and corrosion and erosion of process equipment in subsequent disposal. Therefore, the waste incineration fly ash must be pretreated before disposal to reduce the chlorine content in the fly ash to meet the requirements of subsequent disposal.

At present, the waste incineration fly ash mainly includes the following treatment technologies.

A waste incineration fly ash treatment system is authorized and published in the Chinese patent with the application number of CN207081011U. The waste incineration fly ash treatment system mainly includes a fly ash supply system, a water washing system, an evaporation system, an oxidation alkali leaching system and a leaching liquid treatment system. Heavy metal ions are removed by a chelating agent to realize softening treatment of ash washing wastewater.

A fly ash treatment process mainly applied to a fly ash water washing system and a wastewater treatment system is disclosed in the Chinese patent with the application number of CN108607870A. The combined process of multi-stage fly ash water washing and ash washing wastewater purification treatment can reduce the negative impact of subsequent cement kiln co-disposal. Heavy metal ions such as zinc, copper, nickel, chromium and lead in the ash washing wastewater are removed in the form of sulfide precipitation by using sodium sulfide and polyacrylamide flocculant, and dioxin is removed by activated carbon. But there are still some problems, such as incomplete removal of heavy metal ions and dioxin, and difficult recycling of chemicals.

A fly ash treatment system and a fly ash treatment device are disclosed in a China patent with the application number of CN109290345A. An ash washing wastewater treatment unit adopts the combined process of decalcification, filtration, neutralization and MVR (Mechanical Vapor Recompression) evaporation crystallization. The treatment and disposal methods of secondary countercurrent rinsing, co-flocculation precipitation and multi-effect evaporation are adopted to realize the removal of a large number of chloride ions and the resource utilization of crystallized salts, but the treated ash washing wastewater has not been completely cleaned.

SUMMARY

The present disclosure aims to provide a domestic waste incineration fly ash treatment system.

In order to achieve the above purpose, the present disclosure provides the following scheme.

A domestic waste incineration fly ash treatment system includes a three-stage water washing subsystem, a filtrate post-treatment subsystem, an MVR evaporation salt production subsystem, a pressure filtration subsystem, and a filter cake post-treatment subsystem.

The three-stage water washing subsystem includes three stages of stirring and water washing reaction tanks and three stages of sedimentation tanks. Each stage includes one stirring and water washing reaction tank and one sedimentation tank, and a discharge port of said one stirring and water washing reaction tank is connected with a feed port of said one sedimentation tank. Filtrate and filter cake in a first stage of sedimentation tank are introduced into a second stage of stirring and water washing reaction tank, and filtrate and filter cake in a second stage of sedimentation tank are introduced into a third stage of stirring and water washing reaction tank; residual filtrate in the second stage of sedimentation tank is mixed with supplementary water and then refluxed to the first stage of sedimentation tank, and residual filtrate in the third stage of sedimentation tank is mixed with supplementary water and then refluxed to the second stage sedimentation tank. The filtrate and filter cake treated by the three-stage water washing subsystem are respectively introduced into the filtrate post-treatment subsystem and the pressure filtration subsystem; process water with a water-cement ratio of 10:1 is fed into the stirring and water washing reaction tanks.

The filtrate post-treatment subsystem includes an inorganic membrane filtration reaction tank, an alkali regulating reaction tank, a heavy metal removal reaction tank and a hardening reaction tank which are sequentially connected to one another. An inorganic ceramic membrane with a pore size of less than or equal to 100 nm is arranged in the inorganic membrane filtration reaction tank for filtering the filtrate. An acidic solution is introduced into the alkali regulating reaction tank to regulate pH of the filtrate to be neutral. A heavy metal directional adsorption material is introduced into the heavy metal removal reaction tank. An alkaline solution is introduced into the hardening reaction tank. The filtrate treated by the hardening reaction tank is introduced into the MVR evaporation salt production subsystem for evaporation salt production.

The filter cake is press-filtered by the pressure filtration subsystem and then conveyed to the filtrate post-treatment subsystem for treatment.

In some embodiments, the heavy metal directional adsorption material is a porous polymer material with a memory function. The heavy metal directional adsorption material is configured for selectively binding and removing target metal ions, and is prepared by:

a, coordinating the target metal ions with organic ligands to synthesize a type of metal clusters which can be further polymerized;

b, adding a cross-linking agent to cross-link with the metal clusters to form a porous polymer material; and c, treating the polymer material with acids to remove the target metal ions to form the porous polymer material with a memory function.

In some embodiments, the heavy metal directional adsorption material is covalent organic frameworks (COFs).

In some embodiments, the heavy metal removal reaction tank includes a filter device and an acidification reaction tank.

Fly ash washing wastewater treated by the heavy metal removal reaction tank is introduced into the hardening reaction tank. After solid-liquid filtration of reaction waste liquid in the heavy metal removal reaction tank through the filter device, a solid part, namely the heavy metal directional adsorption material with adsorbed heavy metal ions, enters the acidification reaction tank to acidify and recycle the heavy metal directional adsorption material. The recycled adsorption material is recycled into the heavy metal removal reaction tank.

In some embodiments, the pressure filtration subsystem is a plate-and-frame filter press device, and includes a plate-and-frame filter press, a mixing device, a drying device and a conveying device which are sequentially connected to one another. The conveying device conveys the treated filter cake to the filter cake post-treatment subsystem for treatment.

In some embodiments, the filtrate output from the plate-and-frame filter press is introduced into the first stage of sedimentation tank and/or the inorganic membrane filtration reaction tank acting as circulating water.

In some embodiments, the filter cake post-treatment subsystem is a high-temperature sintering system, a high-temperature gasification/plasma melting system, a cement kiln co-disposal system or a solidification/stabilization treatment system.

In some embodiments, the inorganic ceramic membrane is has a pore size of less than or equal to 100 nm.

In some embodiments, the alkaline solution in the hardening reaction tank is a soluble carbonate solution. The hardening reaction tank is a conventional tank made of non-metallic materials.

In some embodiments, the MVR evaporation salt production subsystem includes a preheater, a heater and a separator which are sequentially connected to one another. The filtrate treated by the preheater is introduced into the heater via a circulating pump. The separator is configured for separating potassium salt and sodium salt. Residual water separated by the separator is transported back to the heater via a compressor, heated and evaporated by the heater, and then introduced into the preheater after heated and evaporated by the heater.

In some embodiments, the MVR evaporation salt production subsystem is in a three-stage salt production mode, which product coarse salt, fine salt and impurity salt sequentially.

Through the present disclosure, clean and efficient treatment of municipal solid waste incineration fly ash is realized, and resource utilization is realized while soluble chlorine salts are removed and heavy metal ions and dioxin are adsorbed. Compared with the prior art, the present disclosure has the following advantages and effects.

Firstly, the present disclosure realizes the reduction of chlorine content in fly ash in the water washing pretreatment process, including the elution of NaCl, KCl, $CaCl_2$, CaClOH and Friedel-like salts with great solubility difference therebetween. The chlorine removal rate of three-stage water washing can reach 99%.

Secondly, the present disclosure solves the problems of low selectivity and sensitivity, high treatment cost and incomplete removal of heavy metals in fly ash due to various types and large concentration difference. The ash washing wastewater after removal meets content indexes of the heavy metals in the standard (T/CCAS 010-2019) of water washing chlorides in co-disposal fly ash pretreatment products with a cement kiln, and some heavy metals (Cr, Hg) can meet wastewater discharge standards.

Thirdly, by adopting the inorganic ceramic membrane in the present disclosure, microparticle fly ash such as dioxin is intercepted in a targeted manner, thus promoting the resource application of inorganic salts in ash washing wastewater. The content of dioxin in chloride after interception of the microparticle fly ash (containing dioxin) is less than or equal to 0.1 μg/kg.

Fourthly, the process flow is simple and easy to control, and after the waste liquid generated in the treatment process is eluted, multi-stage recycling can be realized, and the cost is saved.

Fifthly, the MVR evaporation salt production subsystem is in a three-stage salt production mode, three stages product coarse salt, fine salt and impurity salt sequentially. After multi-stage salt production treatment, impurity components in the clear liquid are greatly reduced, and the recycling of the sodium salt and potassium salt is realized.

BRIEF DESCRIPTION OF THE DRAWINGS

To more clearly illustrate the embodiment of the present disclosure or the technical scheme in the prior art, the following briefly introduces the attached figures to be used in the embodiment. Apparently, the attached figures in the following description show merely some embodiments of the present disclosure, and those skilled in the art may still derive other drawings from these attached figures without creative efforts.

REFERENCE SIGNS 1, fly ash bin; 2, three-stage water washing subsystem; 201, first stage of stirring and water washing reaction tank; 202, second stage of stirring and water washing reaction tank; 203, third stage of stirring and water washing reaction tank; 3, sedimentation tank; 301, first stage of sedimentation tank; 302, second stage of sedimentation tank; 303, third stage of sedimentation tank; 4, pressure filtration subsystem; 401, plate-and-frame filter press; 402, mixing device; 403, drying device; 404, conveying device; 5, filtrate post-treatment subsystem; 501, inorganic membrane filtration reaction tank; 502, alkali regulating reaction tank; 50201, first feeding device; 503, heavy metal removal reaction tank; 50301, second feeding device; 50302, filter device; 50303, acidification reaction tank; 504, hardening reaction tank; 50401, third feeding device; 6, MVR evaporation salt production subsystem; 601, preheater; 602, circulating pump; 603, heater; 604, compressor; 605, separator; 7, high-temperature melting gasification system; 8, high-temperature plasma melting system; 9, cement kiln co-disposal system; 10, high-temperature sintering system; and 11, solidification/stabilization treatment system.

DETAILED DESCRIPTION OF THE EMBODIMENTS

The following clearly and completely describes the technical scheme in the embodiments of the present disclosure with reference to the attached figures in the embodiments of the present disclosure. Apparently, the described embodiments are merely a part rather than all of the embodiments of the present disclosure. Based on the embodiment in the present disclosure, all other embodiments obtained by the ordinary technical staff in the art under the premise of without contributing creative labor belong to the scope protected by the present disclosure.

A domestic waste incineration fly ash treatment system, as shown in FIG. 1 to FIG. 5, includes a three-stage water washing subsystem 2, a filtrate post-treatment subsystem 5, an MVR evaporation salt production subsystem 6, a pressure filtration subsystem 4, and a filter cake post-treatment subsystem. The filter cake post-treatment subsystem includes a high-temperature sintering system 10, a high-temperature gasification/plasma melting system, a cement kiln co-disposal system 9 or a solidification/stabilization treatment system 11. Wherein, the high-temperature gasification/plasma melting system includes a high-temperature melting gasification system 7 and a high-temperature plasma melting system 8.

The three-stage water washing subsystem 2 includes three stages of stirring and water washing reaction tanks and three stages of sedimentation tanks. Each stage includes one stirring and water washing reaction tank and one sedimentation tank. A discharge port of said one stirring and water washing reaction tank is connected with a feed port of said one sedimentation tank. Filtrate and filter cake in a first stage of sedimentation tank and a second stage of sedimentation tank are respectively introduced into a second stage of stirring and water washing reaction tank and a third stage of stirring and water washing reaction tank. Residual filtrate in the second stage of sedimentation tank and a third stage of sedimentation tank are mixed with supplementary water and then respectively refluxed to the first stage of sedimentation tank and the second stage of sedimentation tank. The filtrate and filter cake treated by the three-stage water washing subsystem are introduced into the filtrate post-treatment subsystem and the pressure filtration subsystem. Process water with a water-cement ratio of 10:1 is fed into the stirring and water washing reaction tanks.

The filtrate post-treatment subsystem 5 includes an inorganic membrane filtration reaction tank 501, an alkali regulating reaction tank 502, a heavy metal removal reaction tank 503 and a hardening reaction tank 504 which are sequentially connected to one another. An inorganic ceramic membrane with a pore size of less than or equal to 100 nm is arranged in the inorganic membrane filtration reaction tank 501 for filtering the filtrate. An acidic solution is introduced into the alkali regulating reaction tank 502 to regulate pH of the filtrate to be neutral. A heavy metal directional adsorption material is introduced into the heavy metal removal reaction tank 503. An alkaline solution is introduced into the hardening reaction tank 504. The filtrate treated by the hardening reaction tank 504 is introduced into the MVR evaporation salt production subsystem for evaporation salt production. The filter cake is press-filtered by the pressure filtration subsystem 4 and then conveyed to the filtrate post-treatment subsystem for treatment.

The heavy metal directional adsorption material is a porous polymer material with a memory function. The heavy metal directional adsorption material includes covalent organic frameworks (COFs). The heavy metal directional adsorption material is configured for selectively binding and removing target metal ions, and is prepared by:
a, coordinating the target metal ions with organic ligands to synthesize a type of metal clusters which can be further polymerized;
b, adding a cross-linking agent to cross-link with the metal clusters to form a porous polymer material; and
c, treating the polymer material with acids to remove the target metal ions to form the porous polymer material with a memory function.

Figure 7:
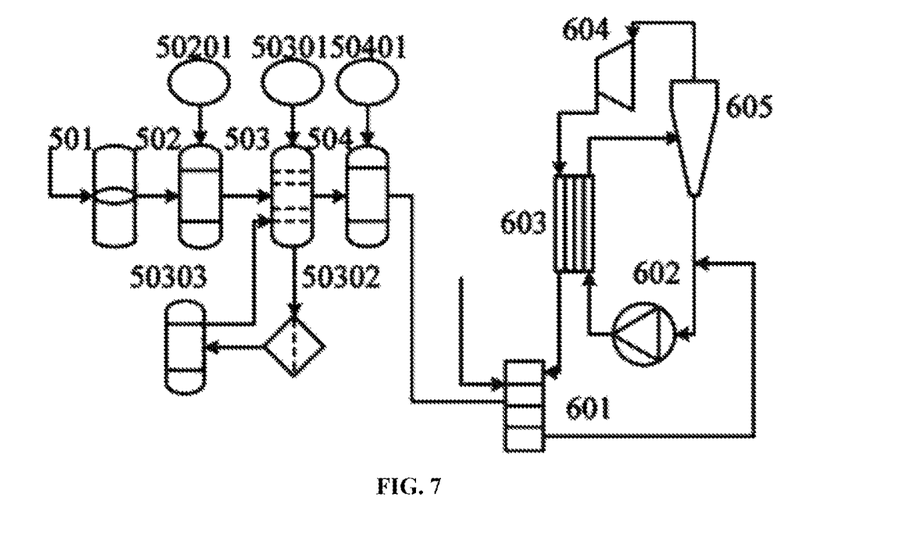
FIG. 7 is a detailed schematic flow diagram of a filtrate post-treatment subsystem in the present disclosure.

The heavy metal removal reaction tank includes a filter device 50302 and an acidification reaction tank 50303. Fly ash washing wastewater treated by the heavy metal removal reaction tank is introduced into the hardening reaction tank 504. After solid-liquid filtration of reaction waste liquid in the heavy metal removal reaction tank through the filter device, a solid part, namely the heavy metal directional adsorption material with adsorbed heavy metal ions, enters the acidification reaction tank 50303 to acidify and recycle the heavy metal directional adsorption material. The recycled adsorption material is recycled into the heavy metal removal reaction tank. The alkaline solution in the hardening reaction tank 504 is a soluble carbonate solution. The hardening reaction tank 504 is a conventional tank made of non-metallic materials.

The pressure filtration subsystem 4 is a plate-and-frame filter press device, and includes a plate-and-frame filter press 401, a mixing device 402, a drying device 403 and a conveying device 404 which are sequentially connected to one another. The conveying device 404 conveys the treated filter cake to the filter cake post-treatment subsystem 5 for treatment. The filtrate output from the plate-and-frame filter press 401 is introduced into the first stage of sedimentation tank and/or the inorganic membrane filtration reaction tank acting as circulating water.

The filter cake post-treatment subsystem is a high-temperature sintering system 10, a high-temperature gasification/plasma melting system, a cement kiln co-disposal system or a solidification/stabilization treatment system 11.

The MVR evaporation salt production subsystem 6 includes a preheater 601, a heater 603 and a separator 605 which are sequentially connected to one another. The filtrate treated by the preheater 601 is introduced into the heater 603 via a circulating pump. The separator 605 is configured for separating potassium salt and sodium salt, residual water separated by the separator 605 is transported back to the heater 603 via a compressor, heated and evaporated by the heater, and then introduced into the preheater 601 after heated and evaporated by the heater.

The MVR evaporation salt production subsystem 6 is in a three-stage salt production mode, three stages product coarse salt, fine salt and impurity salt sequentially.

Specifically; the filter cake is press-filtered by the pressure filtration subsystem 4 and then conveyed to the filtrate post-treatment subsystem for treatment. Domestic waste incineration fly ash is firstly pretreated by the three-stage water washing subsystem 2, and then separated by the plate-and-frame filter press 401 or pretreated by water washing. Solid-liquid separation is realized through sedimentation in the sedimentation tanks 3. The filtrate post-treatment subsystem 5 mainly purifies the separated ash washing wastewater. The high-temperature melting gasification system 7 and/or high-temperature plasma melting system 8 and/or cement kiln co-disposal system 9 and/or high-temperature sintering system 10 and/or solidification/stabilization treatment system 11 mainly treat the pretreated fly ash.

Figure 1:
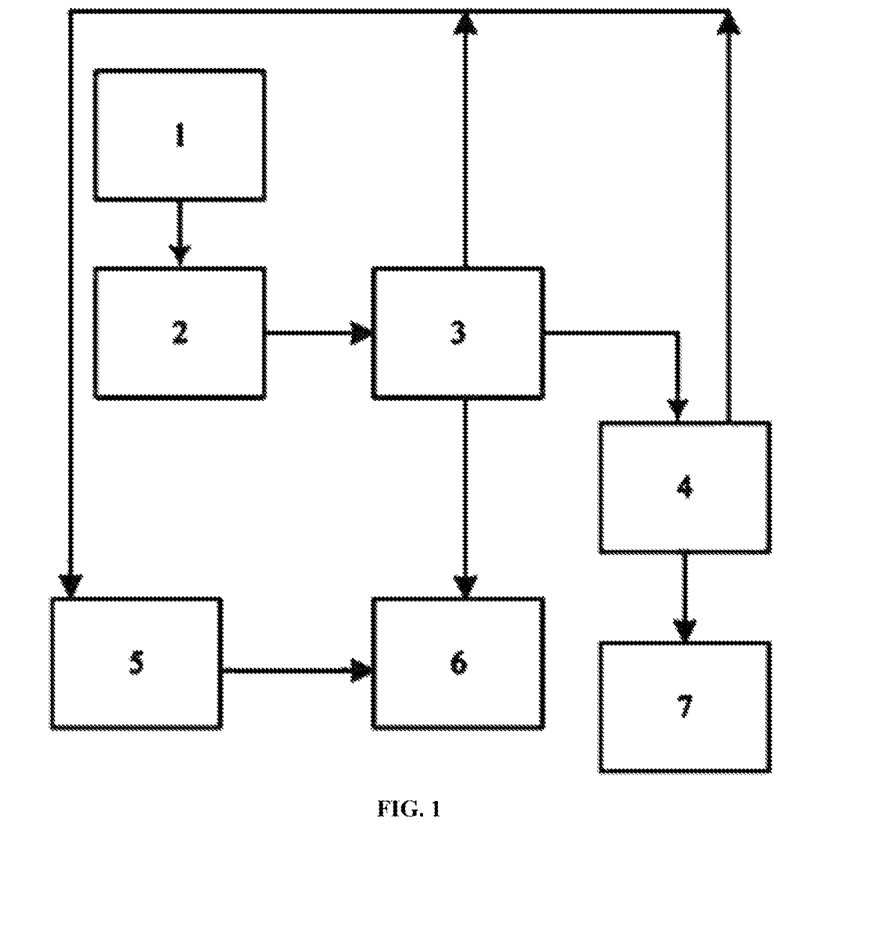
FIG. 1 is a first process flow diagram of a domestic waste incineration fly ash treatment process in the present disclosure.
Figure 2:
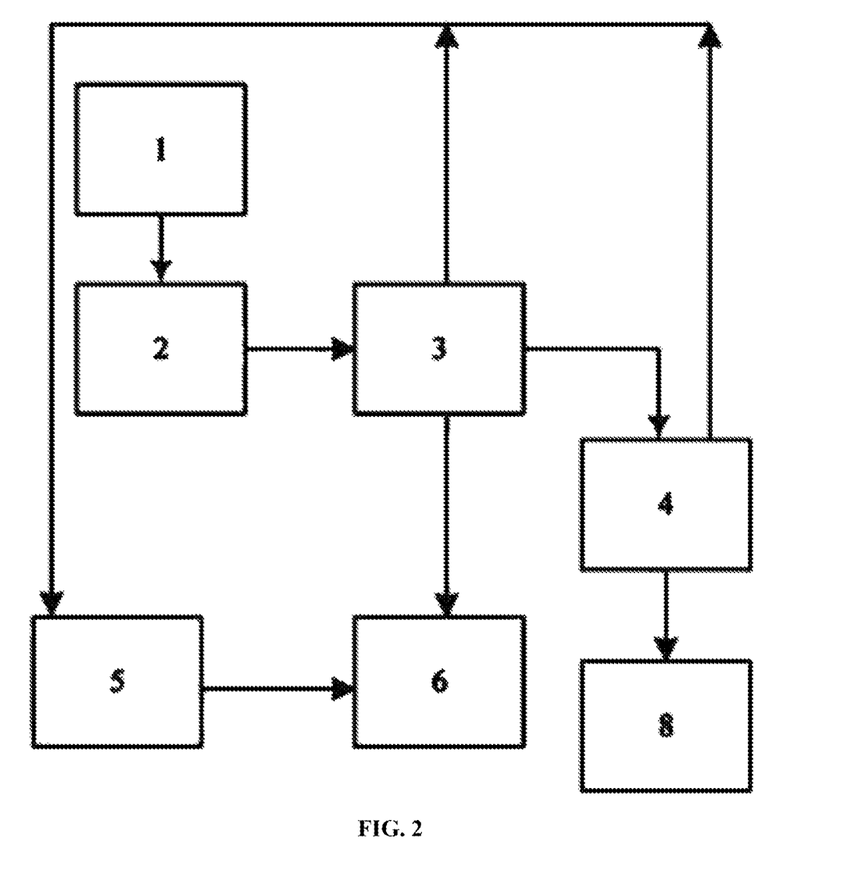
FIG. 2 is a second process flow diagram of a domestic waste incineration fly ash treatment process in the present disclosure.
Figure 3:
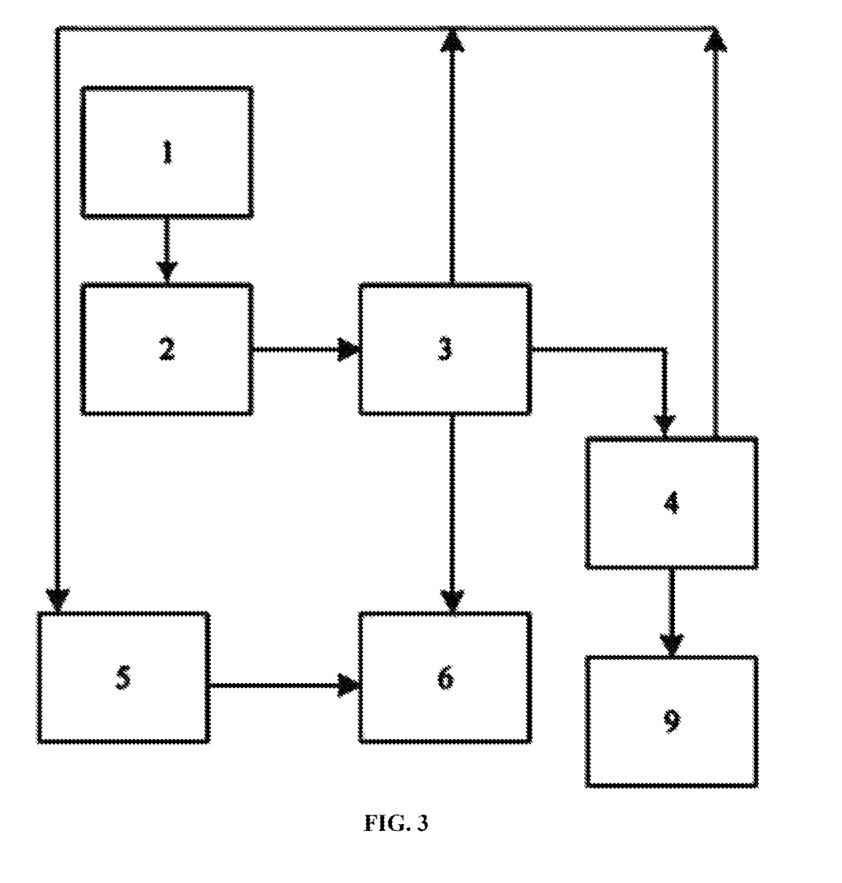
FIG. 3 is a third process flow diagram of a domestic waste incineration fly ash treatment process in the present disclosure.
Figure 4:
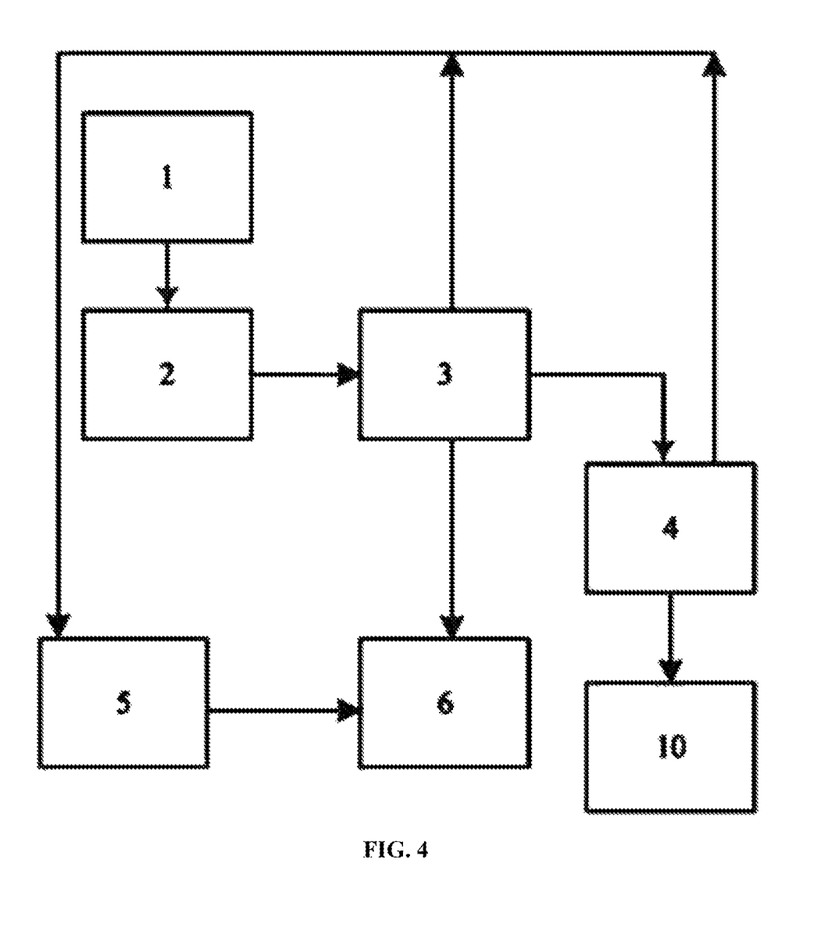
FIG. 4 is a fourth process flow diagram of a domestic waste incineration fly ash treatment process in the present disclosure.
Figure 5:
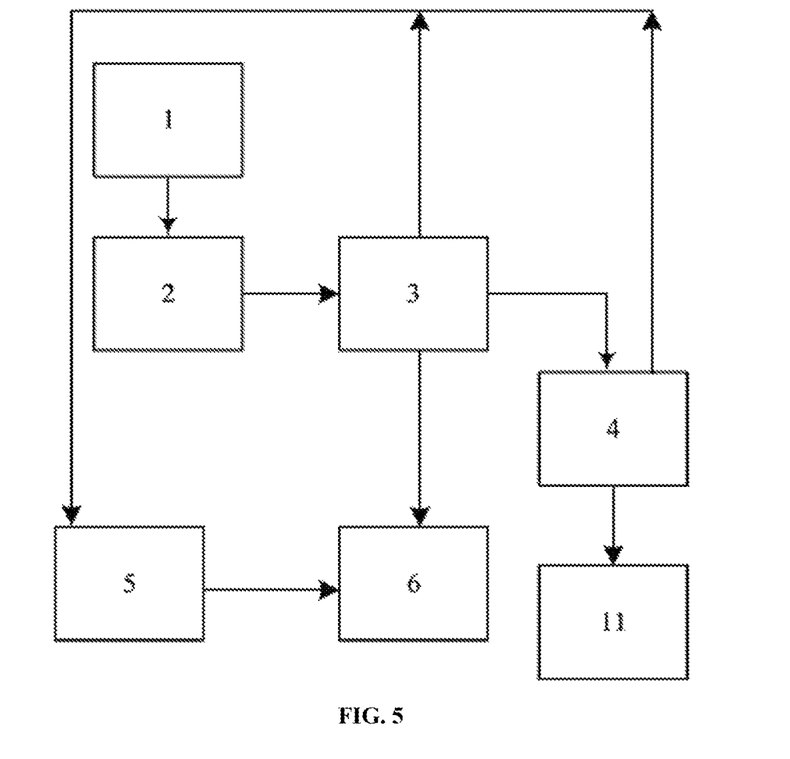
FIG. 5 is a fifth process flow diagram of a domestic waste incineration fly ash treatment process in the present disclosure.
Figure 6:
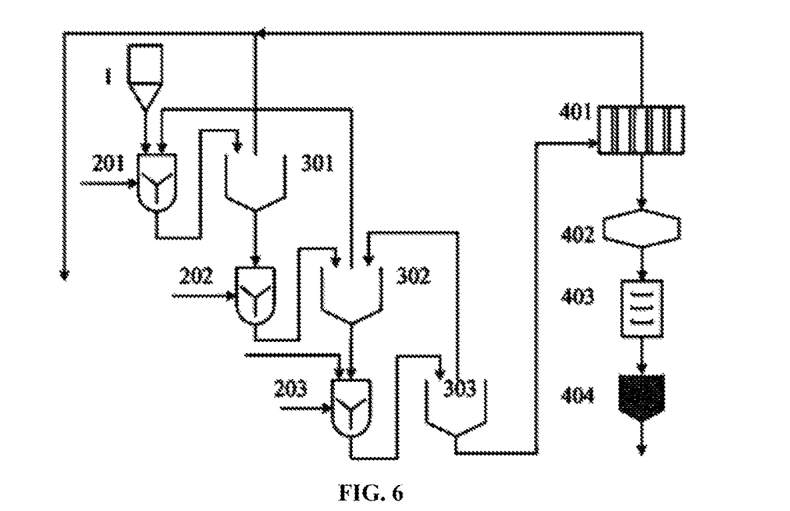
FIG. 6 is a detailed schematic flow diagram of a three-stage water washing subsystem in the present disclosure.

A specific domestic waste incineration fly ash recycle washing system and the filtrate post-treatment subsystem in the present disclosure are shown in FIG. 6 and FIG. 7.

Structures and process flows of the systems are specifically as follows.

Firstly, the three-stage washing subsystem 2 adopts a three-stage countercurrent circulating gradient washing process. When circulating gradient washing treatment is carried out on fly ash, process water (supplementary water or filtrate collected from washing) with a water-cement ratio of 10:1 is fed into pre-stirred washing reaction tanks. Raw fly ash in a fly ash bin 1 is directly introduced into the first stage of stirring and water washing reaction tank 201, and the ash washing residual filtrate in a two-stage sedimentation tank 302 is mixed with the supplementary water and then refluxed to flow into the first stage of stirring and water washing reaction tank 201 for first stage of stirring and water washing. The filter cake after precipitation by first stage of stirring and water washing is mixed with the ash washing residual filtrate in the third stage of sedimentation tank 303 and the supplementary water, and then introduced into the second stage of stirring and water washing reaction tank 202 for second stage of stirring and water washing. Finally; the residual filter cake after precipitation by second stage of stirring and water washing is mixed with the residual filtrate of first stage of stirring and water washing filtered by a water treatment unit and the supplementary water, and then introduced into a third stage of stirring and water washing reaction tank 203 to complete third stage of water washing. The residual filter cake is introduced into the plate-and-frame filter press device for press-filter. After three-stage circulating gradient water washing, the chlorine removal rate reaches 99%.

Secondly, the filter cake treated by the three-stage water washing subsystem 2 is introduced into the pressure filtration subsystem 4. The washed fly ash is separated from water by the plate-and-frame filter press 401. The fly ash (filter cake) treated by a first first stage of/second first stage of plate-and-frame filter press 401 connected in series is dried by the drying device 403 and/or mixed by the mixing device 402 and conveyed to subsequent fly ash treatment processes, such as heat treatment processes of the high-temperature melting gasification system 7, the high-temperature plasma melting system 8 and the cement kiln co-disposal system 9, and subsequent treatment and resource application of the solidification/stabilization treatment system 11. The filtrate after treatment of the first first stage of 7 second first stage of plate-and-frame filter press 401 is introduced into the first stage of sedimentation tank 301 and/or the inorganic membrane filtration reaction tank 501 acting as circulating water.

Thirdly, the filtrate treated by the three-stage water washing subsystem 2 is introduced into the filtrate post-treatment subsystem 5. The filtrate post-treatment subsystem includes an inorganic membrane filtration reaction tank 501, an alkali regulating reaction tank 502, a heavy metal removal reaction tank 503 and a hardening reaction tank 504 which are sequentially connected to one another.

By adopting a ceramic membrane filtration technology, residual microparticle fly ash (containing dioxin) in circulating washing clear liquid in the inorganic membrane filtration reaction tank 501 are intercepted. The microparticle fly ash (most of dioxin attached to the microparticle fly ash) are intercepted under the action of microchannels (with a pore size of less than or equal to 100 nm) in the inorganic membrane filtration reaction tank 501. In the embodiment, a ceramic membrane filter with high filtration accuracy and filtration flux is prepared according to the effects of a type of ceramic membrane material, particle size, a type and the content of pore-forming agent, forming and drying parameters and sintering temperature on structural properties and mechanical properties of porous materials. Specifically, the membrane pore size is controlled through type, size and quantity of pore-forming agents to achieve required membrane pore size distribution and porosity. The bonding strength between the membrane material and the support is controlled according to type, particle size and firing temperature of raw materials. By adding additives, the expansion coefficients of the support and the membrane materials are controlled to prevent the support and the membrane materials from cracking due to difference of expansion coefficients. According to various and different operating parameters (surface velocity, pressure and temperature) of the ceramic membrane filter, fly ash particles in fly ash washing solutions with different concentrations can be accurately intercepted. The content of dioxin in chloride after interception of the microparticle fly ash (containing dioxin) is less than or equal to 0.1 μg/kg.

The eluted ash washing wastewater is introduced into the alkali regulating reaction tank 502. Acidic solutions including hydrochloric acid, sulfuric acid and the like are added through a first feeding device 50201 to regulate a pH value of the ash washing wastewater filtered by ceramic membrane from 12-13 to 7-9 to be neutral. One or more novel heavy metal ion adsorption materials put into and/or mixed and recycled by a second feeding device 50301 can combine and detect specificity of $Cu^{2+}$, $As^{3+}$, $Cr^{3+}$, $Hg^{2+}$, $Pb^{2+}$, $Cd^{2+}$ and $Fe^{3+}$. Efficient and stable removal of heavy metal ions with different valence states is realized in the heavy metal removal reaction tank 503. In the embodiment, adsorption and removal of the heavy metals mainly refer to COI's, namely covalent organic frameworks. Considering that different functional groups have different adsorption selectivity for heavy metals, for example, corrole has strong adsorption selectivity for Cr(III) and sulfydryl has strong adsorption selectivity for Hg(II), the covalent organic frameworks CorMeO—COF containing carbaryl groups and COF—S—SH containing sulfhydryl groups are used as adsorption materials for selectively adsorbing and removing Cr(III) and Hg(II) in the ash washing wastewater. By using the material as a adsorbent, the concentrations of Cr(III) and Hg(II) in the wastewater can be reduced to below 0.1 mg/kg and 0.02 mg/kg, reaching the standard of drinking water.

The COFs used in the present disclosure form a porous polymer material with a specific memory function, and has a formation mode of metal clusters with coordination functional groups as follows. Firstly, target metal ions are coordinated with organic ligands to synthesize a type of metal clusters which can be further polymerized. A cross-linking agent is added to cross-link with the metal clusters to form the porous polymer material. The polymer material is treated with acids to remove the metal ions, thus forming the porous polymer material with a memory function. Because the type of materials has a selective coordination effect on the removed metal ions, the type of materials can be configured for selectively binding and removing the target metal ions, and the adsorption material can be regenerated by acidification washing.

Through a series of porous polymer materials with a specific memory function, the target metal ions can be removed efficiently and selectively by using high sensitivity of coordination groups. The ash washing wastewater after removal meets indexes of the heavy metals in water washing chloride after selective adsorption and removal of the heavy metals, and some heavy metals (Cr, Hg) can meet wastewater discharge standards, namely the concentration of lead (Pb) is less than or equal to 25 mg/kg, the concentration of cadmium (Cd) is less than or equal to 2.5 mg/kg, the concentration of chromium (Cr) is less than or equal to 1.5 mg/kg, the concentration of mercury (Hg) is less than or equal to 0.02 mg/kg, and the concentration of arsenic (As) is less than or equal to 5 mg/kg.

The ash washing wastewater from which the heavy metal ions are removed by the heavy metal removal reaction tank 503 is introduced into the hardening reaction tank 504, and the reaction waste liquid from the heavy metal removal reaction tank 503 is sent to the filter device 50302.

After solid-liquid separation of the reaction waste liquid by the filter device 50302, an adsorption material adsorbed with heavy metal ions enters the acidification reaction tank 50303. In the acidification reaction tank 50303, an acidic solution is added to the used waste liquid containing a heavy metal directional adsorption material. After the heavy metal ions are dissolved, the recycled adsorption material is recycled into the heavy metal removal reaction tank 503 for adsorbing the heavy metal ions, so that regeneration and recycling of the adsorption material are realized. The heavy metal ions are dissolved in the acidification reaction tank and need to be replaced on schedule. The ash washing wastewater is introduced into the hardening reaction tank 504, and soluble carbonates (such as $Na_2CO_3$ and $K_2CO_3$) are added into the conventional tank made of non-metallic materials through a third feeding device 50401 for hardening treatment. The index of water hardness is controlled below 0.6 mmol/L.

Fourthly, high-salinity wastewater generated by fly ash washing is evaporated by the MVR evaporation salt production subsystem 6 after several wastewater treatment processes, such as processes of the pressure filtration subsystem 4, the inorganic membrane filtration reaction tank 501, the alkali regulating reaction tank 502, the heavy metal removal reaction tank 503 and the hardening reaction tank 504. The ash washing waste liquid after hardening treatment in the hardening reaction tank 504 has main components of NaCl and KCl, secondary components of alkaline substances such as $Na_2CO_3$, $Na_2SO_4$ and NaOH, and a trace amount of other impurities. The ash washing wastewater entering the MVR evaporation salt production subsystem 6 firstly enters the preheater 601 and then enters the heater 603 through the circulating pump 602 for evaporation and dehydration. Dehydrated inorganic salts are separated from the potassium salt and the sodium salt in the separator 605, so that the inorganic salts can be recycled. At the same time, residual moisture of the ash washing wastewater separated by the separator 605 is transported by the compressor 604, heated and evaporated by the heater 603, and then introduced into the preheater 601 to supply heat.

All embodiments in this specification are described in a progressive manner. Each embodiment focuses on differences from other embodiments. For the part that is the same or similar between different embodiments, reference may be made between the embodiments.

Several examples are used for illustration of the principles and implementation methods of the present disclosure. The description of the embodiments is used to help illustrate the method and the core principles of the present disclosure; and meanwhile, those skilled in the art can make various modifications in terms of specific embodiments and scope of application in accordance with the teachings of the present disclosure. In conclusion, the content of this specification shall not be construed as a limitation to the present disclosure.

What is claimed is:

1. A domestic waste incineration fly ash treatment system, comprising a three-stage water washing subsystem, a filtrate post-treatment subsystem, an MVR evaporation salt production subsystem, a pressure filtration subsystem, and a filter cake post-treatment subsystem; wherein:

the three-stage water washing subsystem comprises three stages of stirring and water washing reaction tanks that are a first stage of stirring and water washing reaction tank, a second stage of stirring and water washing reaction tank and a third stage of stirring and water washing reaction tank, and three stages of sedimentation tanks, each stage includes one stirring and water washing reaction tank and one sedimentation tank, and a discharge port of said one stirring and water washing reaction tank is connected with a feed port of said one sedimentation tank; the first stage of stirring and water washing reaction tank is configured to receive fly ash; the second stage of stirring and water washing reaction tank is configured to receive filtrate and filter cake from a first stage of sedimentation tank; the third stage of stirring and water washing reaction tank is configured to receive filtrate and filter cake from a second stage of sedimentation tank; the first stage of sedimentation tank is configured to receive a mixture of supplementary water and residual filtrate from the second stage of sedimentation tank; the second stage sedimentation tank is configured to receive a mixture of supplementary water and residual filtrate from the third stage of sedimentation tank; the filtrate post-treatment subsystem is configured to receive filtrate treated by the three stage water washing subsystem; the pressure filtration subsystem is configured to receive filter cake treated by the three stage water washing subsystem; each of the stirring and water washing reaction tanks is configured to receive process water with a water-cement ratio of 10:1;

the filtrate post-treatment subsystem comprises an inorganic membrane filtration reaction tank, an alkali regulating reaction tank, a heavy metal removal reaction tank and a hardening reaction tank which are sequentially connected to one another; the inorganic membrane filtration reaction tank comprises an inorganic ceramic membrane with a pore size of 100 nm, wherein the inorganic membrane is configured to filter the filtrate;

the alkali regulating reaction tank is configured to receive an acidic solution and to regulate pH of the filtrate to be neutral;

the heavy metal removal reaction tank comprises a heavy metal directional adsorption material, a filter device, and an acidification tank, wherein the filter device is configured to perform a solid-liquid filtration of reaction waste liquid from a solid part comprising the heavy metal directional adsorption material with adsorbed heavy metal ions; and wherein the acidification tank is configured to acidify and recycle the heavy metal directional adsorption material into the heavy metal removal reaction tank;

the hardening reaction tank is a tank made of non-metallic materials, wherein the hardening reaction tank is configured to receive a soluble carbonate solution and the filtrate filtered by the filter device in the heavy metal removal reaction tank; and wherein the MVR evaporation salt production subsystem is configured to receive the filtrate treated in the hardening reaction tank;

the heavy metal directional adsorption material is a porous polymer material with a memory function, configured for selectively binding and removing target metal ions, and prepared by:

coordinating the target metal ions with organic ligands to synthesize a type of metal clusters which can be further polymerized;

adding a cross-linking agent to cross-link with the metal clusters to form a porous polymer material; and treating the polymer material with acids to remove the target metal ions to form the porous polymer material with a memory function;

the pressure filtration subsystem is configured to receive the filter cake and convey the filter cake to the filter cake post-treatment subsystem.

2. The system according to claim 1, wherein the heavy metal directional adsorption material is covalent organic frameworks (COFs).

3. The system according to claim 1, wherein the pressure filtration subsystem is a plate-and-frame filter press device, and comprises a plate-and-frame filter press, a mixing device, a drying device and a conveying device which are sequentially connected to one another; and the conveying device is configured to convey the filter cake to the filter cake post-treatment subsystem.

4. The system according to claim 3, wherein the first stage of sedimentation tank and/or the inorganic membrane filtration reaction tank are/is configured to receive a filtrate output from the plate-and-frame filter press.

5. The system according to claim 1, wherein the filter cake post-treatment subsystem is a sintering system, a gasification/plasma melting system, a cement kiln co-disposal system or a solidification/stabilization treatment system.

6. The system according to claim 1, wherein the MVR evaporation salt production subsystem comprises a preheater, a heater and a separator which are sequentially connected; the heater is configured to receive filtrate treated by the preheater via a circulating pump; the separator is configured for separating potassium salt and sodium salt, the heater is configured to receive, heat and evaporate the residual water separated by the separator via a compressor, and wherein the preheater is configured to receive evaporated water from the heater.

* * * * *